United States Patent
Patel et al.

(10) Patent No.: US 11,868,410 B2
(45) Date of Patent: Jan. 9, 2024

(54) METHOD AND SYSTEM FOR CONTROLLING PROCESSING TIME FOR DATA SERVER RESPONSE TO INFORMATION QUERY

(71) Applicant: Sprint Spectrum L.P., Overland Park, KS (US)

(72) Inventors: Kashyap Patel, Overland Park, KS (US); Rajil Malhotra, Olathe, KS (US)

(73) Assignee: SPRINT SPECTRUM LLC, Bellevue, WA (US)

( * ) Notice: Subject to any disclaimer, the term of this patent is extended or adjusted under 35 U.S.C. 154(b) by 201 days.

(21) Appl. No.: 16/921,518

(22) Filed: Jul. 6, 2020

(65) Prior Publication Data

US 2022/0004586 A1 Jan. 6, 2022

(51) Int. Cl.
| | |
|---|---|
| G06F 16/00 | (2019.01) |
| G06F 16/951 | (2019.01) |
| G06F 16/9535 | (2019.01) |
| G06F 16/2455 | (2019.01) |
| G06F 16/248 | (2019.01) |
| H04L 61/4588 | (2022.01) |

(52) U.S. Cl.
CPC .......... *G06F 16/951* (2019.01); *G06F 16/248* (2019.01); *G06F 16/2455* (2019.01); *G06F 16/9535* (2019.01); *H04L 61/4588* (2022.05)

(58) Field of Classification Search
CPC .............. G06F 16/951; G06F 16/9535; G06F 16/2455; G06F 16/248; H04L 61/1588
USPC .................................................. 707/600–899
See application file for complete search history.

(56) References Cited

U.S. PATENT DOCUMENTS

| | | | | |
|---|---|---|---|---|
| 9,928,379 | B1* | 3/2018 | Hoffer | G16H 50/70 |
| 2006/0195468 | A1* | 8/2006 | Yanagi | G06F 16/90 |
| | | | | 707/999.102 |
| 2008/0288446 | A1* | 11/2008 | Hu | G06F 16/2462 |
| 2012/0213152 | A1* | 8/2012 | Hegarty | H04L 65/80 |
| | | | | 370/328 |
| 2014/0137120 | A1* | 5/2014 | Zhelev | G06F 11/0715 |
| | | | | 718/101 |
| 2019/0253917 | A1* | 8/2019 | Dao | H04M 15/8016 |

OTHER PUBLICATIONS

International Search Report and Written Opinion from International Application No. PCT/US21/40161, dated Oct. 6, 2021.

* cited by examiner

*Primary Examiner* — Irete F Ehichioya
*Assistant Examiner* — Shirley D Hicks
(74) *Attorney, Agent, or Firm* — Lee & Hayes P.C.

(57) ABSTRACT

A method and system for controlling processing by a data server. An example method includes a computing system receiving from a client entity a request for information, and, responsive to receiving from the client entity the request, the computing system (i) determining, based on the client entity from which the computing system received the request, a processing time limit for the data server to apply in processing a query for the information and (ii) generating and sending to the data server the query, including in the query an indication of the determined processing time limit. The data server could thus receive and process the query and impose the specified processing time limit on the processing of the received query.

17 Claims, 4 Drawing Sheets

METHOD AND SYSTEM FOR CONTROLLING PROCESSING TIME FOR DATA SERVER RESPONSE TO INFORMATION QUERY

BACKGROUND

A communication network typically contains or has access to a data server that functions as a repository of useful information related to network resources or other objects and is configured to respond to queries from other network nodes. Without limitation, such a server could be configured as a Lightweight Directory Access Protocol (LDAP) server compliant with the well-known LDAP protocol, which could store information in one or more LDAP trees or other data structures to facilitate searching for and responding to requests for information. Alternatively, the server could be another type of directory server (or directory server agent) or the like.

By way of example, a representative network owned or operated by or for a cellular wireless service provider could include a data server in the form of Subscriber Profile Repository (SPR) or Unified Data Repository (UDR), which could store or otherwise have access to profile records specifying service-subscription profiles, capabilities, access credentials, policies, and/or one or more other attributes of or related to devices or other subscribers to service provided by the wireless service provider. And the data server could be configured to receive and respond to queries from other entities in or associated with the service provider's network, seeking subscriber profile-related information to help facilitate providing cellular wireless service.

As another example, an LDAP server (e.g., an Active Directory server) owned or operated by or for a corporation or other organization could store network access credentials and associated user or account information, and could be configured to receive and respond to queries seeking to authenticate users and/or facilitate other business operations. Numerous other examples are possible as well.

OVERVIEW

In an example network, various entities may require access to the information in such a repository and may from time to time query for the information. For efficiency to help accommodate these requests for information, the network could be arranged with a hierarchical structure in which a middle-layer server or mediator is responsible for interactions with the data server. With this arrangement, various network entities, as client entities, could be configured to generate and direct their requests for information to the mediator, and the mediator could be configured to respond to those requests by querying the data server to obtain the requested information and returning the obtained information to the requesting client entities.

In an example cellular wireless communication network that includes or has access to an SPR, for instance, the mediator could be a Home Subscriber Server (HSS). In particular, the HSS could be responsible for interacting with the SPR and receiving and responding to requests from various client entities, such as a Mobility Management Entity (MME), a Call Session Control Function (CSCF), and a Telephony Application Server (TAS), among others. When any such client entity requires subscriber profile related information, the entity could thus generate and transmit a request message to the HSS, and the HSS could in turn query the SPR to obtain the requested information and then return the obtained information to the requesting client entity.

Alternatively or additionally, if the cellular wireless communication network includes or has access to a UDR, the mediator could be a Unified Data Management (UDM) (e.g., a UDM function). In particular, the UDM could thus be responsible for interacting with the UDR and receiving and responding to requests from various client entities, such as an Access and Mobility Management Function (AMF), a Session Management Function (SMF), and an Authentication Server Function (AUSF), among others. When any such client entity requires subscriber profile related information, the entity could thus generate and transmit a request message to the UDM, and the UDM could in turn query the UDR to obtain the requested information and then return the obtained information to the requesting client entity.

In a representative system, each such client entity could be configured to apply a respective timeout period according to which, if the entity does not receive a response from the mediator within the timeout period, the entity may retry its request to the mediator, perhaps retrying up to a set number of times. Further, various client entities could be configured with different such timeout periods than each other.

When the mediator queries the data server, the mediator could include in its query to the data server a processing time limit (e.g., an LDAP TimeLimit value) that could define a maximum length of time that the data server should spend processing the query. The data server could then accordingly spend up to just that indicated amount of time conducting a search for the requested information and responding to the mediator's query.

In the representative system, however, the mediator would be set with a fixed processing time limit to specify in its queries to the data server. Therefore, the mediator would not vary the processing time limit based on the timeout periods of the various requesting client entities. Yet to help ensure that the data server processes each query from the mediator quickly enough to accommodate whatever timeout period the querying client entity may have, this fixed processing time limit could be set by engineering design to the shortest value necessary to accommodate the shortest possible or expected timeout period of the various client entities.

Unfortunately, though, setting this processing time limit to the shortest such value could be undesirable, as it may cause the data server to process some queries with unnecessarily high speed, which could unnecessarily consume data-server processing power. Namely, setting the processing time limit to the same shortest period for each query to the data server may cause the data server to process all queries from the mediator at a relatively high speed, using high processing power sufficient to complete processing within that short time limit, even though in many cases the timeout periods of the requesting client entities may be long enough to not require such quick response.

The present disclosure provides a mechanism to help address this technological problem.

In accordance with the disclosure, the mediator could include or otherwise have access to mapping data that correlates each of various client entities or client-entity types with a respective processing time limit for queries to the data server. When the mediator receives from a client entity a request for information, the mediator could then refer to that mapping data to determine, based on an identity or type of the requesting client entity, a corresponding processing time limit. And the mediator could then specify that determined processing time limit in its query to the data server.

Optimally, the respective processing time limit that the mapping data correlates with a given client entity's identity or type could be a value that would align with the timeout value that that client entity is configured to apply. Further, the respective processing time limit could also account for the time that it would take for propagation of signaling between the client entity and the mediator and between the mediator and the data and for processing by the mediator. For instance, if the client entity is set to apply a timeout period of T milliseconds, and if the aggregate total time for signal propagation (between the client entity and the mediator and between the mediator and the data server) and mediator processing is likely to be at most Q milliseconds, then the processing time limit could be set to a value of L milliseconds, where L=T−Q. Alternatively or additionally, the respective time limit per client entity identity or type could take into account other factors as well.

With this arrangement, each such query that the mediator sends to the directory server could cause the directory server to process the query with a processing time limit that is aligned (or at least more aligned than otherwise) with the timeout value that the requesting client entity is configured to apply. Therefore, the arrangement could help better manage processing power at the data server.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present disclosure will focus by way of example on implementation in the context of a cellular communication network having nodes configured to operate as noted above. It will be understood, however, the disclosed principles could be applied in numerous other contexts as well, such as in networks other than cellular communication networks, and/or with different data servers, different mediators, and/or different client entities, and for different purposes. Further, even as to the example implementation described, it will understood that numerous variations are possible. For example, elements or operations could be added, removed, combined, distributed, replicated, re-ordered, or otherwise modified. In addition, operations described as being performed by one or more entities could be implemented in various ways, such as by a processor executing instructions stored in non-transitory data storage, along with associated circuitry and/or other hardware, among other possibilities.

Figure 1:
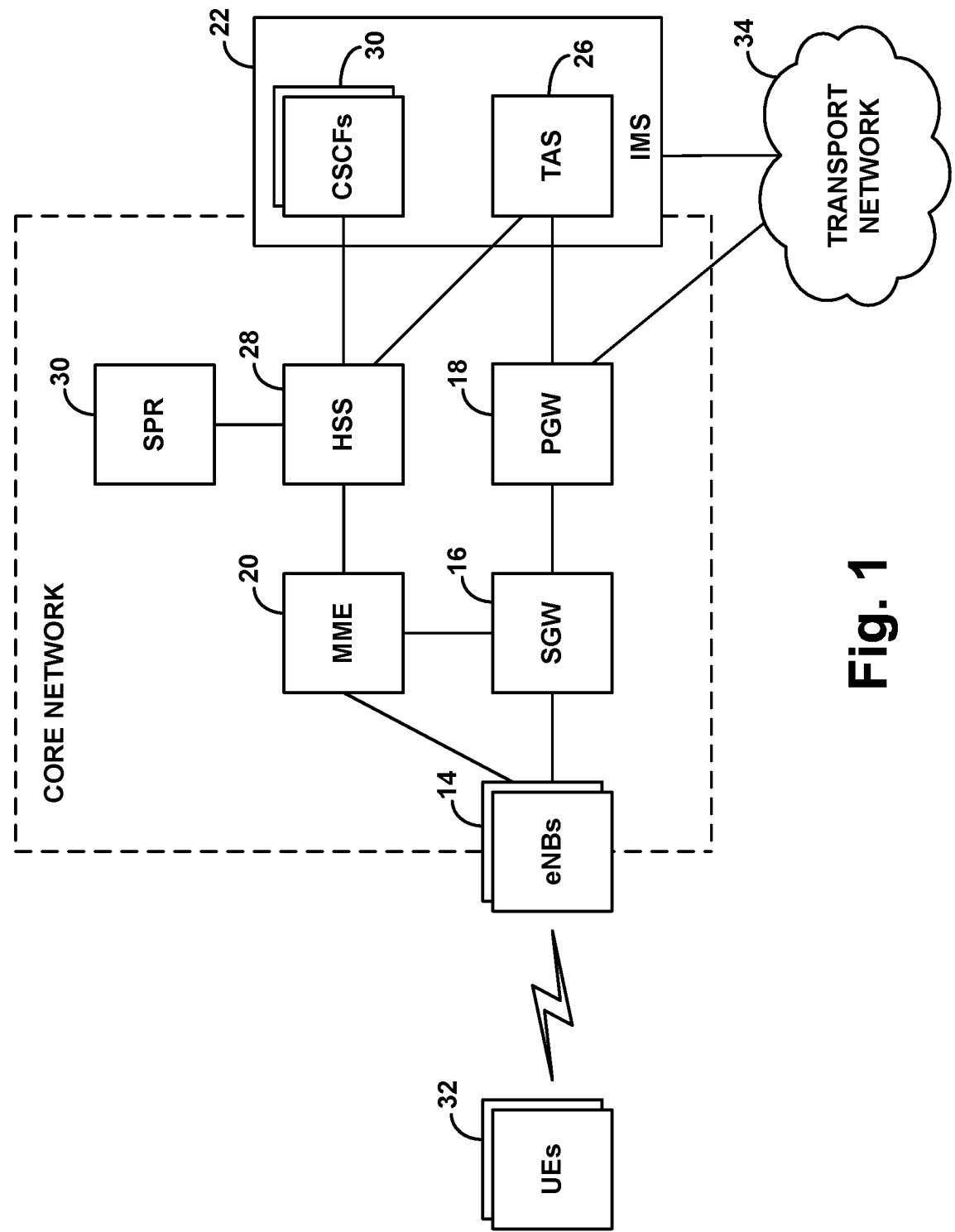
FIG. 1 is a simplified block diagram of an example arrangement in which principles of the present disclosure can be implemented.

Without limitation, FIG. 1 depicts an example cellular network architecture in which principles of the present disclosure can be implemented. In particular, FIG. 1 depicts an example 4G network architecture for supporting 4G Long Term Evolution (LTE) communication, among other possibilities. As shown in FIG. 1, the example 4G architecture includes a 4G core network 12, which could be an Enhanced Packet Core (EPC) network for instance, in which various network nodes have assigned Internet Protocol (IP) addresses and can engage in communication with each other through packet-based communication tunnels or other interfaces.

In the example shown, the 4G core network 12 includes or provides connectivity with various entities including evolved Node-Bs (eNBs) 14, a serving gateway 16, a packet-data network gateway (PGW) 18, an MME 20, and an Internet Multimedia Subsystem (IMS) 22 encompassing various CSCFs 24 and a TAS 26, among other possibilities.

With this example arrangement, each eNB 14 could be configured to provide cellular wireless coverage in which to serve user equipment devices (UE)s 32. An the SGW 16 and PGW 18 could cooperatively function to provide user-plane connectivity between each eNB 14 and a packet-switched transport network 34 such as the Internet and/or with the IMS 26, so as to enable UEs served by the eNBs 14 to engage in communication on the transport network 34 and/or with the IMS 26. Further, the MME 20 could function to manage UE attachment, bearer setup, and mobility tracking. And the IMS 22, through operations of its various CSCFs 24 and TAS 26 and other entities, could function to support providing voice-over-IP (VoIP) and other such packet-based real-time media services for served UEs.

The example 4G network is then further shown including an HSS 28 and an SPR 30. As illustrated, the HSS 28 has communication interfaces with various entities, such as with the MME 20, with a CSCF 24 (e.g., an Interrogating CSCF (I-CSCF)), and with the TAS 26. For instance, the HSS 28 could have an S6a interface with the MME 20, a Cx interface with the CSCF 24, and an Sh interface with the TAS 26, and messaging between the HSS and these various entities could be compliant with the DIAMETER protocol among other possibilities. Further, the SPR 30 could be an LDAP server, the HSS 28 could have an LDAP interface with the SPR 30, and messaging between the HSS 28 and the SPR 30 could be compliant with LDAP among other possibilities.

In practice with this arrangement, the MME 20, CSCF 24, and TAS 26 could be examples of the querying network entities as discussed above, the HSS 28 could be an example mediator as discussed above, and the SPR 30 could be an example data server as discussed above.

Each of the MME 20, CSCF 24, and TAS 26 could thus be configured to send DIAMETER request messages to the HSS 28, seeking profile-related information by way of example, and the HSS 28 could be configured to respond to each such request by sending a corresponding LDAP query to the SPR 30, receiving from the SPR 30 an LDAP response including the requested information, and returning that information in a DIAMETER response message to the requesting entity.

By way of example, when a UE 32 initially enters into coverage of the example network and connects with an eNB 14, the UE 32 may engage in an attachment process through signaling, via the eNB 14, with the MME 20. And in connection with this attachment process, the MME 20 may transmit to the HSS 28 a DIAMETER request seeking to obtain service profile data of the UE 32. In response to this DIAMETER request, the HSS 28 may then transmit to the SPR 30 an associated LDAP query seeking the profile data. And in response to the LDAP query, the SPR 30 may then search through its data to find the requested profile data and may return the profile data in an LDAP response to the HSS 28. And the HSS 28 may then return this obtained profile data in a DIAMETER response to the MME 20.

As another example, if and when a connected and attached UE 32 engages in Session Initiation Protocol (SIP) registration with the IMS 22, an I-CSCF 24 of the IMS 22 may transmit to the HSS 28 a DIAMETER request seeking to obtain service profile data such an address of a Serving CSCF (S-CSCF) to be used in serving the UE 32. And in response to this DIAMETER the HSS 28 may likewise transmit to the SPR 30 an associated LDAP query seeking that S-CSCF information. The SPR 30 may then similarly search through its data to find the requested information and return the information in an LDAP query to the HSS 28. And the HSS 28 may then return this obtained information in a DIAMETER response to the I-CSCF 24.

As still another example, if and when the TAS 26 is going to provide telephony service for a UE that has registered with the IMS 22, the TAS 26 may likewise send to the HSS 28 a DIAMETER request seeking information related to a service profile of the UE 32. And the HSS 28 may likewise send an associated LDAP query to the SPR 30, the SPR 30 may likewise process the query and return the requested information in an LDAP response to the HSS 28, and the HSS 28 may likewise return the obtained information a DIAMETER response to the TAS 26.

As discussed above, the MME 20, CSCF 24, and TAS 26, as example client entities, could each be configured with a respective timeout period defining how long the entity would wait for a DIAMETER response from HSS 28 before retrying its DIAMETER request.

In an example implementation, these timeout periods could be configured by engineering design and could differ per entity, such as per type of entity, perhaps based on expected or actual operational requirements and/or other factors. Therefore, the timeout periods could differ among the various entities. Without limitation, for instance, MMES might generally be set with a respective first timeout period, CSCFs might generally be set with a respective second timeout period that may differ from the first timeout period, and TASs (or application servers more generally) might generally be set with a third timeout period that may differ from the first and second timeout periods.

As discussed above, when the HSS 28 sends an LDAP query to the SPR 30, the HSS 28 could include in the LDAP query a processing time limit that defines a maximum time limit for the SPR 30 to process the query. Under LDAP, this processing time limit could be an LDAP TimeLimit value. In accordance with this specified time limit, the SPR 30 could thus work to complete its processing of the LDAP query within the specified processing time limit, devoting necessary processing power (e.g., processor cycles at a sufficient rate) if available to process the query quickly enough.

In general, it may take more processing power (e.g. processing at a higher rate) for the SPR 30 to respond to a typical LDAP query having a relatively short processing time limit than for the SPR 30 to respond to a typical LDAP query having a relatively long processing time limit. Further, the SPR's ability to distribute its limited available processing power for multi-tasking and the like could be more limited when the SPR 30 processes LDAP queries with relatively short processing time limits than when the SPR 30 processes LDAP queries with relatively long processing time limits.

In line with the discussion above, the HSS 28 could include or otherwise have access to mapping data (e.g., configuration data) that correlates each of various client entities with a respective processing time limit for the HSS 28 to specify in its LDAP query to the SPR 30 in response to a DIAMETER request from the indicated client entity.

By way of example, the mapping data could correlate each of various client-entity classes (e.g., types) with a respective processing time limit. For instance, the mapping data could comprise a database table or a directory having records keyed to client-entity class, with each record specifying for a respective class of client entity a respective processing time limit for the HSS 28 to specify. With the example noted above, representative mapping data might thus specify for the MME class of client entities the first processing time limit, for the CSCF class of client entities the second processing time limit, and for TAS or other application server class of client entities the third processing time limit. Each such class of client entity might be indicated by a class code or one or more other values.

Each DIAMETER request to the HSS 28 could further indicate expressly or by reference the class of the requesting entity. For instance, the DIAMETER request might expressly specify a class code that uniquely indicates the class of the requesting entity. Or the DIAMETER request might include an identifier or simply an IP address of the requesting entity, which could facilitate a lookup to determine the class of the requesting entity. With this or associated information, the HSS 28 could thus refer to the mapping data to determine the associated processing time limit to specify in its LDAP query to the SPR 30, with the determination being based on the class of the requesting client entity.

Alternatively or additionally, the mapping data could correlate each of various individual client-entities a respective processing time limit. For instance, the mapping data could comprise a database table or a directory having records keyed to client-entity identifier (e.g., unique identifier, IP address, or other information), with each record specifying for a respective client entity a respective processing time limit for the HSS 28 to specify. Thus, even among a given class of client entities, there might be some variation in the processing time limits that the mapping data indicates.

Further alternatively or additionally, rather than directly correlating each of various client-entity identities or classes with a respective processing time limit, the mapping data might indirectly correlate each of various client-entity identities or classes with an associated processing time limit. For instance, for each client-entity identity or class, the mapping data could specify the timeout period that the client entity or a client entity of the class is set to apply. Given this mapping data, when the HSS 28 receives a DIAMETER request from a given client entity, the HSS 28 could thus determine, based on the client-entity identity or class, the associated timeout period. And, perhaps accounting for predefined historical data regarding signaling-propagation time and HSS-processing time as noted above, the HSS 28 could then translate that timeout period to an appropriate processing time limit to specify in the LDAP query that the HSS 28 sends to the SPR 30 in response to the client entity's DIAMETER request.

Other data mapping arrangements could be possible as well.

Optimally with this arrangement as discussed above, when the HSS 28 receives a DIAMETER request from a given client entity such as one of those noted above, the HSS 28 could dynamically determine, based on the identity or class of the requesting client entity, an appropriate processing time limit to specify in its LDAP query to the SPR 30. Given this determination, the HSS 28 could then responsively generate and transmit to the SPR 30 an LDAP query that seeks information in accordance with the DIAMETER request and could specify in the LDAP query the determined processing time limit. And upon receipt of this LDAP query, the SPR 30 could accordingly apply the specified processing time limit, thus tailoring its query-processing time based on the processing time limit that the HSS determined based on the identity or class of the requesting client entity.

As noted above, numerous variations from the arrangement and operations described could be possible. Without limitation, for instance, similar functionality could be implemented in a different cellular network architecture, with different client entities, a different mediator, and/or a different data server, among other possibilities.

As one of various other examples, similar functionality could be implemented in the context of an example 5G network architecture that supports 5G New Radio (NR) communication.

In such a network, example client entities could include an AMF, an SMF, and an AUSF, among others, the example mediator could be a UDM, and the example data server could be a UDR. In particular, the AMF and SMF could cooperatively provide control functionality similar to the MME 20 noted above, and the AUSF could function to provide authentication and encryption-key service. Further, the UDR could then store subscriber profile related data similar to the SPR 30, and the UDM could function to receive and respond to requests for information from various client entities by querying and returning information obtained from the UDR.

As with the 4G example discussed above, the UDM in this 5G architecture could include or otherwise have access to mapping data that correlates each of these various client entities (e.g., by unique identity or class) with an associated processing time limit for the UDM to specify in the query that the UDM sends to the UDR in response to an information request from a given client entity. Thus, if each of various client entities or classes has a respective different timeout period for its information requests to the UDM, the disclosed process could enable the UDM to specify a different respective processing time limit in its query to the UDR, with the specified processing time limit being based on the identity or class of the requesting client entity.

Note also that, while the above disclosure focuses on the determination of processing time limit being done by the mediator, an alternative implementation could involve the data server making that determination, with or without involvement of a mediator. For instance, the identity or class of the requesting client entity might propagate expressly or by reference to the data server, perhaps based on the interface used by the mediator to communicate with the data server, and the data server might then refer to mapping data as discussed above to determine based on the client entity's identity or class what processing time limit to apply. The data server might then tailor its processing of the query accordingly.

Further note that requests for information and queries for information discussed herein could take various forms and could specify in various ways the information being sought. By way of example, a DIAMETER request could characterize the requested information in various Attribute-Value Pairs (AVPs) in a manner that would be interpretable by the mediator or other recipient to facilitate obtaining and responding with the requested information. And an LDAP query could characterize the requested information in the form of one or more search filters or distinguished name values, among other possibilities. In addition, note that mediator might translate from an information request received from a requesting entity to the query that the mediator sends to the data server.

Yet further, note that the terms "request" and "query" as used herein could be interchangeable but are used separately for convenience to help distinguish the communication between the client entity and the mediator from the communication between the mediator and the data server.

Figure 2:
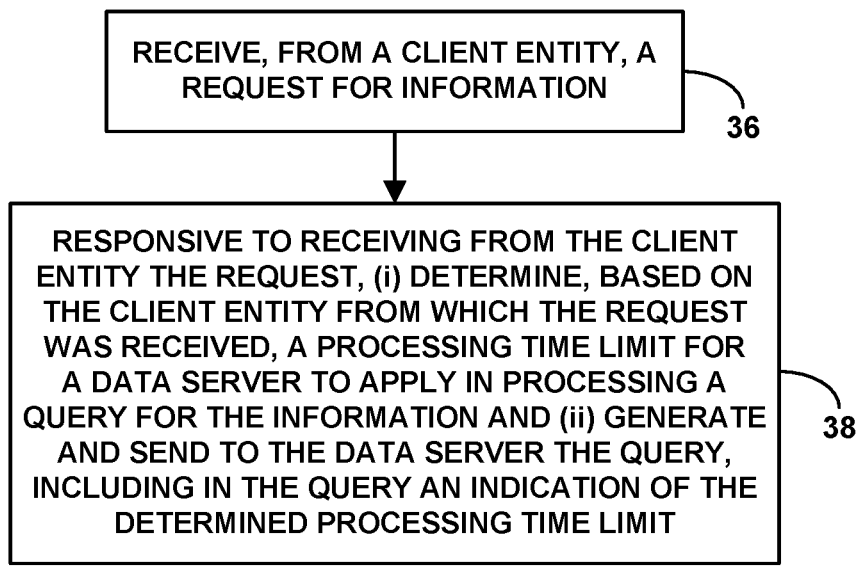
FIG. 2 is a flow chart depicting operations that can be carried out in accordance with the disclosure.

FIG. 2 is next a flow chart depicting a method that could be carried out in accordance with the present disclosure, to help control processing by a data server. In line with the discussion above, this method could be carried out by a computing system such as an HSS or a UDM, which could be in network communication with the data server.

As shown in FIG. 2, at block 36, the method includes the computing system receiving, from a client entity, a request for information. And at block 38, the method then includes, responsive to the computing system receiving from the client entity the request, the computing system (i) determining, based on the client entity from which the computing system received the request, a processing time limit for the data server to apply in processing a query for the information and (ii) generating and sending to the data server the query, including in the query an indication of the determined processing time limit.

Through this method, the data server could thus optimally receive from the computing system the query specifying the processing time limit that the computing system determined based on the client entity from which the computing system received the request for information. And the data server could impose the specified processing time limit on its processing of the received query.

In an example implementation, the query for the information could indicate the information being sought, and the data server's processing of the query could involve the data server searching through data to retrieve the indicated information and could further include the data server generating and transmitting to the computing system a query response providing the retrieved information. The data server could thus complete its processing of the received query within the specified processing time limit and could accordingly send to the computing system a response to the query, providing the information. And the method could further include the computing system receiving the information from the data server in response to the query and sending the received information to the client entity in response to the received request.

In line with the discussion above, the act of the computing system determining, based on the client entity from which the computing system received the request, the processing time limit for the data server to apply in processing the query for the information could involve the computing system determining the processing time limit based on an identity or class of the client entity from which the computing system received the request.

Further, as discussed above, the computing system could have access to mapping data that maps each of various client entity identities or classes to a respective processing time limit, with the mapping data mapping a first client entity identity or class to a first respective processing time limit and mapping a second client entity or class to a second respective processing time limit different than the first respective processing time limit. And the act of the computing system determining, based on the client entity from which the computing system received the request, the processing time limit for the data server to apply in processing the query for the information could involve referring to the mapping data to determine the processing time limit based on the client entity from which the computing system received the request.

Still further, as discussed above, this method could apply in various network arrangements. For instance, the computing system could comprise an HSS, the data server could comprise an SPR, the client entity could comprise an MME, a CSCF, or a TAS. Or the computing system could comprise a UDM, the data server could comprises a UDR, and the client entity could comprise an AMF, an SMF, or an AUSF. Further, the request for information could comprise a DIAMETER request, and the query for information could comprise an LDAP query, in which the determined processing time limit could be specified as a TimeLimit value.

Figure 3:
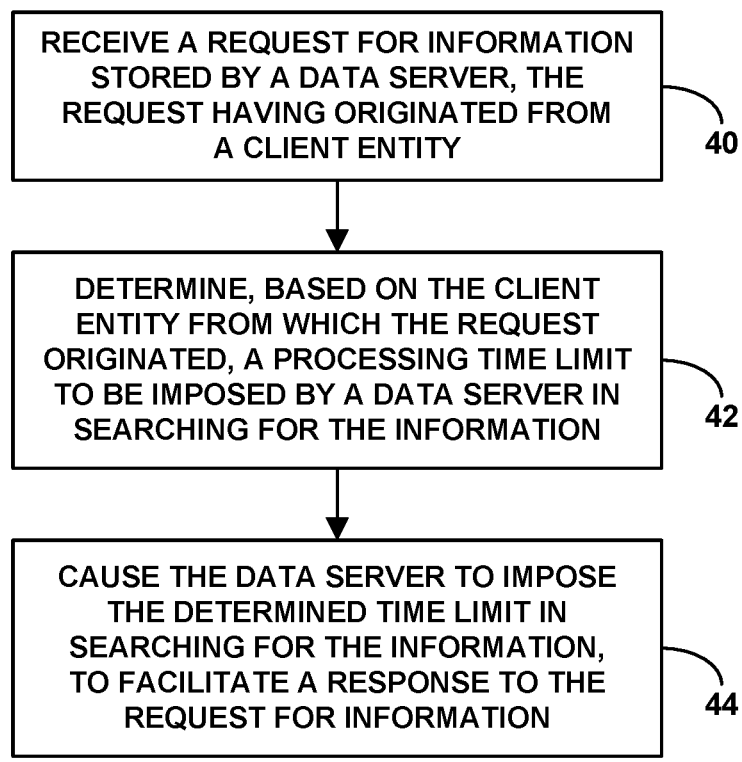
FIG. 3 is another flow chart depicting operations that can be carried out in accordance with the disclosure.

FIG. 3 is next another flow chart depicting a method that could be carried out in accordance with the present disclosure, to help control processing by a data server. As shown in FIG. 3, at block 40 the method includes receiving a request for information stored by the data server, the request having originated from a client entity. Further, at block 42, the method includes determining, based on the client entity from which the request originated, a processing time limit to be imposed by the data server in searching for the information. And at block 44, the method includes causing the data server to impose the determined time limit in searching for the information, to facilitate a response to the request for information.

In line with the discussion above, the act of determining, based on the client entity from which the requests originated, the processing time limit to be imposed by the data server in searching for the information could involve determining the processing time limit based on an identity or class of the client entity.

Further, as discussed above, the method could be carried out by a mediator between the client entity and the data server. And in that case, the mediator could receive from the client entity the request for the information and could responsively send to the data server a query for the information. Causing the data server to impose the determined time limit in searching for the information could then involve the mediator including within the query the determined processing time limit.

Alternatively or additionally, the method could be carried out by a processing unit of the data server. And in this case, the request for information may be a request from the client entity to the data server or might be a request that originated at the client entity and passed to a mediator, with the mediator then passing the request along to the data server, among other possibilities.

Figure 4:
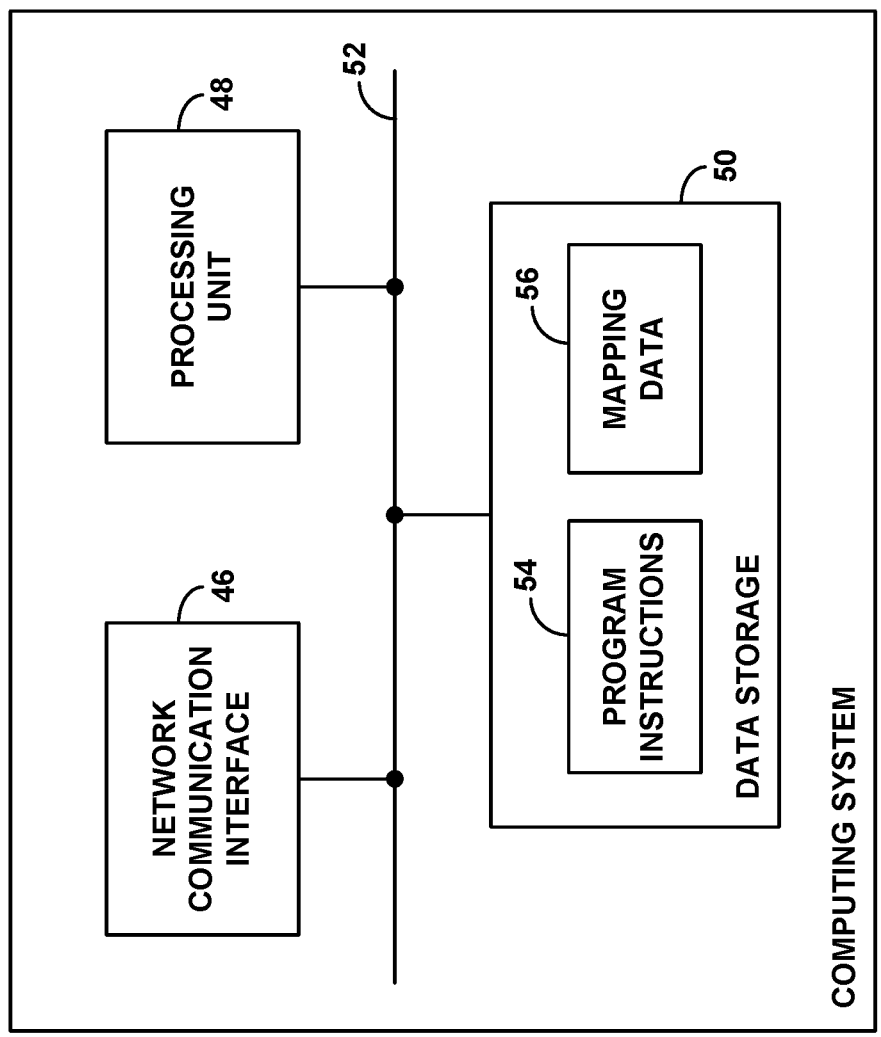
FIG. 4 is a simplified block diagram of an example computing system operable in accordance with the disclosure.

FIG. 4 is a simplified block diagram of an example computing system that could be configured to carry out various operations described herein. This computing system could be a mediator as discussed above, among other possibilities.

As shown in FIG. 4, the example computing system includes a network communication interface 46, a processing unit 48, and non-transitory data storage 50, all of which could be integrated together and/or interconnected by a system bus, network, or other connection mechanism 52.

The network communication interface 46 could comprise a physical network connector and associated communication logic to facilitate network communication with various other entities. The processing unit 48 could comprise one or more general purpose processors (e.g., microprocessors) and/or one or more special-purpose processors (e.g., application specific integrated circuits). And the data storage 50 could comprise one or more volatile and/or non-volatile storage components (e.g., magnetic, optical, or flash storage).

As shown, the data storage 50 could then store program instructions 54, which could be executable by the processing unit 48 to cause the computing system to carry out various operations described herein. For instance, the instructions could be executable to cause the computing system to carry out operations of FIG. 2 and/or FIG. 3.

By way of example, the instructions could be executable to cause the computing system to (a) receive from a client entity, via the network communication interface, a request for information, and (b) responsive to receiving from the client entity the request, (i) determining, based on the client entity from which request was received, a processing time limit for the data server to apply in processing a query for the information, and (ii) generating and sending the query to the data server, via the network communication interface, including in the query an indication of the determined processing time limit. And as noted above, the data server could thus receive and process the query and could impose the specified processing time limit on its processing of the received query.

In line with the discussion above, the data storage 50 could further store mapping data 56, which could map each of various client entity identities or classes to a respective processing time limit, the mapping data mapping a first client entity identity or class to a first respective processing time limit and mapping a second client entity or class to a second respective processing time limit different than the first respective processing time limit.

Various features described above can be implemented in this context as well, and vice versa.

Further, the present disclosure contemplates a computer readable medium encoded with, storing, or otherwise embodying program instructions executable by a processing unit to carry out various operations described herein.

Exemplary embodiments have been described above. Those skilled in the art will understand, however, that changes and modifications may be made to these embodiments without departing from the true scope and spirit of the invention.

We claim:

1. A method for controlling processing by a data server, the method comprising:
   receiving by a computing system, from a client entity, a request for information; and
   responsive to the computing system receiving from the client entity the request, (i) determining by the computing system, based on the client entity from which the computing system received the request, a processing time limit for the data server to apply in processing a query for the information, and (ii) generating and sending by the computing system to the data server the query, including in the query an indication of the determined processing time limit,
   wherein determining the processing time limit based on the client entity from which the computing system received the request comprises determining the processing time limit based on an identity or class of the client entity from which the computing system received the request,
   whereby the data server receives and processes the query and imposes the specified processing time limit on the processing of the received query.

2. The method of claim 1, further comprising:
   receiving, by the computing system, the information from the data server in response to the query; and sending the received information from the computing system to the client entity in response to the request.

3. The method of claim 1, wherein determining, based on the client entity from which the computing system received the request, the processing time limit for the data server to apply in processing the query for the information comprises:
determining the processing time limit based on the identity of the client entity from which the computing system received the request.

4. The method of claim 1, wherein determining based on the client entity from which the computing system received the request, the processing time limit for the data server to apply in processing the query for the information comprises:
determining the processing time limit based on the class of the client entity from which the computing system received the request.

5. The method of claim 1, wherein the computing system has access to mapping data that maps each of various client entity identities or classes to a respective processing time limit, the mapping data mapping a first client entity identity or class to a first respective processing time limit and mapping a second client entity or class to a second respective processing time limit different than the first respective processing time limit, and
wherein determining, based on the client entity from which the computing system received the request, the processing time limit for the data server to apply in processing the query for the information comprises referring to the mapping data to determine the processing time limit based on the client entity from which the computing system received the request.

6. The method of claim 1, wherein the computing system comprises a Home Subscriber Server (HSS), and wherein the data server comprises a Subscriber Profile Repository (SPR).

7. The method of claim 6, wherein the client entity comprises an entity selected from the group consisting of a Mobility Management Entity (MME), a Call Session Control Function (CSCF), and a Telephony Application Server (TAS).

8. The method of claim 1, wherein the request for information comprises a DIAMETER request, and wherein the query for the information comprises a Lightweight Directory Access Protocol (LDAP) query.

9. The method of claim 8, wherein including in the query the indication of the determined processing time limit comprises including in the LDAP query a TimeLimit value indicative of the determined processing time limit.

10. The method of claim 1, wherein the computing system comprises a Unified Data Management (UDM) function, and wherein the data server comprises a Unified Data Repository (UDR).

11. The method of claim 10, wherein the client entity comprises an entity selected from the group consisting of an Access and Mobility Management Function (AMF), a Session Management Function (SMF), and an Authentication Server Function (AUSF).

12. A method for controlling processing by a data server, the method comprising:
receiving a request for information stored by the data server, wherein the request originates from a client entity;
determining, based on the client entity from which the request originated, a processing time limit to be imposed by the data server in searching for the information; and
causing the data server to impose the determined time limit in searching for the information, to facilitate a response to the request for information,
wherein determining the processing time limit based on the client entity from which the request originated comprises determining the processing time limit based on an identity or class of the client entity from which the request originated, and
wherein the method is carried out by a mediator between the client entity and the data server, wherein the mediator receives from the client entity the request for the information and responsively sends to the data server a query for the information, and wherein causing the data server to impose the determined time limit in searching for the information comprises including by the mediator within the query the determined processing time limit.

13. The method of claim 12, wherein determining, based on the client entity from which the requests originated, the processing time limit to be imposed by the data server in searching for the information comprises determining the processing time limit based on an identity or class of the client entity.

14. A computing system for controlling processing by a data server, the computing system comprising:
a network communication interface;
a processing unit;
non-transitory data storage; and
program instructions stored in the non-transitory data storage and executable by the processing unit to cause the computing system to carry out operations including:
receiving from a client entity, via the network communication interface, a request for information, and
responsive to receiving from the client entity the request, (i) determining, based on the client entity from which request was received, a processing time limit for the data server to apply in processing a query for the information, and (ii) generating and sending the query to the data server, via the network communication interface, including in the query an indication of the determined processing time limit,
wherein determining the processing time limit based on the client entity from which the request was received comprises determining the processing time limit based on an identity or class of the client entity from which the request was received,
whereby the data server receives and processes the query and imposes the specified processing time limit on the processing of the received query.

15. The computing system of claim 14, wherein the operations additionally include:
receiving the information from the data server in response to the query; and
sending the received information to the client entity in response to the request.

16. The computing system of claim 14, further comprising:
mapping data stored in the data storage, wherein the mapping data maps each of various client entity identities or classes to a respective processing time limit, the mapping data mapping a first client entity identity or class to a first respective processing time limit and mapping a second client entity or class to a second respective processing time limit different than the first respective processing time limit, wherein determining, based on the client entity from which the request was received, the processing time limit for the data server to apply in processing the query for the information comprises referring to the mapping data to determine the processing time limit based on the client entity from which the request was received.

17. The computing system of claim 14, wherein the computing system is an entity selected from the group consisting of a Home Subscriber Server (HSS) and a Unified Data Management (UDM) function.

* * * * *